(12) United States Patent
Li et al.

(10) Patent No.: US 11,857,111 B2
(45) Date of Patent: Jan. 2, 2024

(54) COOKING DEVICE AND METHOD OF COOKING FOOD ITEM BASED ON PREDICTING FOOD CORE TEMPERATURE

(71) Applicant: KONINKLIJKE PHILIPS N.V., Eindhoven (NL)

(72) Inventors: Qing Li, Eindhoven (NL); Bin Yin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 804 days.

(21) Appl. No.: 15/315,547

(22) PCT Filed: May 27, 2015

(86) PCT No.: PCT/EP2015/061670
§ 371 (c)(1),
(2) Date: Dec. 1, 2016

(87) PCT Pub. No.: WO2015/185404
PCT Pub. Date: Dec. 10, 2015

(65) Prior Publication Data
US 2017/0224161 A1   Aug. 10, 2017

(30) Foreign Application Priority Data

Jun. 6, 2014 (WO) ................ PCT/CN2014/079372
Oct. 15, 2014 (EP) .................................... 14188970

(51) Int. Cl.
*A47J 37/12* (2006.01)
*A47J 36/32* (2006.01)
(Continued)

(52) U.S. Cl.
CPC ........... *A47J 37/1266* (2013.01); *A47J 36/32* (2013.01); *F24C 7/085* (2013.01); *G05D 23/1917* (2013.01); *G05D 23/1928* (2013.01)

(58) Field of Classification Search
CPC .. A47J 37/1266; A47J 36/32; G05D 23/1928; G05D 23/1917; F24C 7/085; H05B 6/6447; H05B 6/686; H05B 6/688; H05B 6/705
See application file for complete search history.

(56) References Cited

U.S. PATENT DOCUMENTS 6,410,066 B1 * 6/2002 Weng ...................... A23L 3/003
426/231
8,360,633 B2   1/2013 Luckhardt
(Continued)

FOREIGN PATENT DOCUMENTS

EP     0794387 A1   9/1997
EP     2026632 A2   2/2009
(Continued)

OTHER PUBLICATIONS

Frank Kreith, Principles of Heat Transfer, 2011, Cengage Learning, Inc., 7th Edition, pp. 117-121 (Year: 2011).*

*Primary Examiner* — Brian W Jennison
(74) *Attorney, Agent, or Firm* — Schott, P.C.

(57) ABSTRACT

The invention provides a cooking device comprising a heating chamber (10), a heating element (12) for heating a cooking medium in the heating chamber, a temperature sensor (14) for monitoring a temperature of the cooking medium over time, and a mass sensor (16) for monitoring a mass of a food item to be cooked in the heating chamber over time. The cooking device also comprises a controller (18) for processing information from the mass sensor and temperature sensor to provide a prediction of the food item core temperature and to control a cooking process in dependence on the predicted food item core temperature.

14 Claims, 4 Drawing Sheets

(51) Int. Cl.
*F24C 7/08* (2006.01)
*G05D 23/19* (2006.01)

(56) References Cited

U.S. PATENT DOCUMENTS

| | | | | |
|---|---|---|---|---|
| 9,420,641 B2 * | 8/2016 | Corona | ............... | H05B 6/686 |
| 2014/0220193 A1 * | 8/2014 | Hocker | ............... | G01K 13/00 |
| | | | | 426/231 |
| 2015/0305543 A1 * | 10/2015 | Matarazzi | ............... | F24C 7/08 |
| | | | | 99/342 |

FOREIGN PATENT DOCUMENTS

| | | | | |
|---|---|---|---|---|
| JP | 05113219 A | | 5/1993 | |
| JP | 06241463 A | | 8/1994 | |
| JP | H06241463 | * | 8/1994 | ............... F24C 7/02 |
| JP | H06242463 | * | 9/1994 | ............... F24C 7/02 |
| JP | 2003307314 | * | 4/2002 | ............... F24C 7/02 |
| JP | 2003307314 | * | 10/2003 | ............... F24C 7/02 |
| JP | 2003307314 A | | 10/2003 | |
| JP | 2007218545 A | | 8/2007 | |
| WO | 2007142493 A1 | | 12/2007 | |
| WO | WO-2007142493 A1 | * | 12/2007 | ............. F24C 3/126 |
| WO | 2008052747 A2 | | 5/2008 | |
| WO | 2008090242 A1 | | 7/2008 | |

\* cited by examiner

FIG. 7

COOKING DEVICE AND METHOD OF COOKING FOOD ITEM BASED ON PREDICTING FOOD CORE TEMPERATURE This application is the U.S. National Phase application under 35 U.S.C. § 371 of International Application No. PCT/EP2015/061670, filed on May 27, 2015, which claims the benefit of International Application No. 14188970.9 filed on Oct. 15, 2014 and International Application No. PCT/CN2014/079372 filed on Jun. 6, 2014. These applications are hereby incorporated by reference herein.

FIELD OF THE INVENTION

This invention relates to a cooking device and method for detecting when the food being cooked is done.

BACKGROUND OF THE INVENTION

Current cooking devices are mostly controlled by user's selection of parameters such as time and temperature. Automatic selection of these cooking parameters would be convenient to the user and could also improve the cooking results by eliminating human error.

In order to control a cooking process accurately, it is necessary to know the key properties of the food during cooking. One key property of the food is the core temperature, which changes as the food is cooked. The core temperature of the food is the important measurement of cooking doneness: for a certain type of food, it should be higher than a certain value to kill the harmful bacteria that cause foodborne illness but should not be too high in order to avoid overcooking. As a result, to ensure safety, foods are suggested to be cooked for an appropriate period of time and with a suitable internal temperature (range).

To determine if an item of food is cooked based on the core temperature, invasive methods are possible, but these will cause damage to the food when detecting core temperature. Non-invasive methods such as infrared sensing have limited penetration ability so are usually used to detect the surface temperature.

There is therefore a need for a non-invasive way to detect the core temperature of an item being cooked.

EP 0794 387 A1 discloses a method of estimating temperature of inner portion of a material to be cooked and a thermal cooking apparatus using the same method.

SUMMARY OF THE INVENTION

It is an object of the invention to provide a method of predicting food core temperature, and a cooking device and cooking method, which substantially alleviates or overcomes above-mentioned problems.

The invention is defined by the independent claims. The dependent claims define advantageous embodiments.

According to the invention, there is provided a cooking device, comprising:
a heating chamber;
a heating element for heating a cooking medium in the heating chamber;
a temperature sensor for monitoring a temperature of the cooking medium over time;
a mass sensor for monitoring a mass of a food item to be cooked in the heating chamber over time; and
a controller for processing information from the mass sensor and temperature sensor to provide a prediction of the food item core temperature and to control a cooking process in dependence on the predicted food item core temperature.

The invention is based on the recognition that the core temperature of a food item during cooking can be predicted based on a set of non-invasive parameters, including at least the temperature over time and the evolution over time of the mass of the food item during cooking. The temperature and mass information can be obtained without requiring contact with the food item, and enable simple implementation for example for a home cooking appliance, such as an air fryer. Preferably, the controller is adapted to derive the rate of change of mass over time and/or the rate of change of temperature over time. By obtaining rate of change information, a more accurate model for predicting the food item core temperature can be formulated.

The invention can be used in an automatic cooking control method, based on the prediction of core temperature of (solid phase) food. The device can be low-cost, sufficiently robust to control the cooking process, and therefore suitable for use in a home cooking appliance.

The device preferably has different settings for different food types, wherein the controller processes the information from the mass sensor and temperature sensor differently for different food types. Different types of food item will exhibit different cooking characteristics, so that the controller takes account of the type of food item. This can be input manually by the user. The user may also be able to input an indication of how well done the food item is to be cooked. This will then influence the target core temperature of the food item.

The device may further comprise a sensor for determining an initial food temperature, wherein the controller is adapted to process the information from the mass sensor and temperature sensor differently for different initial food temperatures.

This enables the cooking device to distinguish between fresh and frozen food for example, without requiring the user to input this information. The initial food temperature will influence the evolution of the core temperature over time and can thus be part of the model which predicts the core temperature. Instead of providing a sensor as part of the device, the user can input the initial temperature, for example based on the known fridge or freezer temperature from which the food has been taken.

The cooking medium may be air or oil.

The air temperature in an oven or air fryer may be used, or the oil temperature in an oil fryer may be used. The approach may indeed be used for any non-water cooking medium where mass change is predominantly due to the water loss of the food. In either case, the mass change can be monitored by measuring the mass without the food and then the mass with the food and during subsequent cooking.

One or more additional sensors may be provided, for monitoring one or more of a humidity, a food moisture level and a food surface temperature.

The model which characterizes the core temperature function can take account of other parameters which can be measured in a non-invasive way. This may enable a more accurate model to be derived.

The mass sensor may comprise a pressure sensor.

This provides a simple way to measure and monitor the mass of the food item. The mass of the food item and a known support tray or mesh can be measured by the pressure sensor. In this case, the mass sensor is beneath the food. The mass sensor may instead suspend the food. In both cases, the mass sensor is based on measuring weight which can then of course be converted to mass.

The controller may be adapted to provide the prediction of the food item core temperature from information from the mass sensor and temperature sensor by comparison with a model which is based on experimental data, for example obtained during an initial testing process.

The model can use a combination of theoretical equations and practical test data to characterize the behavior of the core temperature over time. For example the core temperature can be predicted using equations with parameters which relate to the particular type of food, and these parameters can be selected based on the experimental data.

The controller may be adapted to provide the prediction of the food core temperature from information from the mass sensor and temperature sensor by comparison with a model, wherein the model further provides a prediction of at least one measurable property, and wherein the controller is adapted to update the model based on monitoring of the measurable parameter to provide a more accurate model for the prediction of the food item core temperature.

By using the model to predict both the un-measurable core temperature of the food item and one or more measurable properties, the accuracy of the model can be tested, and the model can be updated accordingly. If the model includes parameters which are needed both to predict the core temperature and the measurable property or properties, the measurable property or properties can be used as a way of verifying the accuracy of the parameters used in the model.

The invention also provides a method of predicting the core temperature of a food item during cooking using a heating element for heating a cooking medium in a heating chamber, the method comprising:

a step of monitoring a temperature of the cooking medium over time using a temperature sensor;

a step of monitoring a mass of a food item to be cooked in the heating chamber over time using a mass sensor; and a step of processing information from the mass sensor and temperature sensor to provide a prediction of the food item core temperature thereby to enable control of a cooking process in dependence on the predicted food item core temperature.

Preferably, the temperature and mass information are obtained without contact with the food item.

The method may comprise receiving a user input identifying a food type, and processing the mass sensor and temperature sensor information in a manner dependent on the food type. A sensor may be used for determining an initial food temperature, wherein the controller is adapted to process the mass sensor and temperature sensor information in a manner dependent on the initial food temperature.

The prediction of the food item core temperature may be made from the information from the mass sensor and temperature sensor by comparison with a model, wherein the model further provides a prediction of at least one measurable property, and wherein the controller is adapted to update the model based on monitoring of the measurable property to provide a more accurate model for the prediction of the food core temperature.

By using the model to predict both the un-measurable core temperature of the food item and a measurable property, the accuracy of the model can be tested, and the model can be updated accordingly. The measurable property may comprise the mass of the food item. Thus, the model can predict the way the mass evolves over time. Since this is monitored as part of the cooking process, the model accuracy can be tested. Other properties which can be predicted using the same model may instead or additionally be used.

The invention also provides a cooking method comprising:

a step of commencing cooking of a food item in a heating chamber of a cooking device;

a step of predicting the core temperature of the food item over time using the method of the invention; and a step of controlling the cooking device in dependence on the predicted core temperature.

The control of the cooking device may comprise stopping cooking when cooking is complete (for example based on a user setting for how well done the food it to be) and/or it may involve controlling the cooking temperature, for example so that the cooking is complete at a pre-set time.

The invention also provides a computer program comprising code means which is adapted, when run on a computer, to perform the steps of the method of the invention.

BRIEF DESCRIPTION OF THE DRAWINGS

Examples of the invention will now be described in detail with reference to the accompanying drawings, in which.

DETAILED DESCRIPTION OF EMBODIMENTS

The invention provides a cooking device in which a temperature sensor monitors a temperature of the cooking medium (i.e. the oven air or oil) over time and a mass sensor monitors a mass of an item to be cooked over time. The information from the mass sensor and temperature sensor are used to provide a prediction of the food item core temperature and a cooking process is controlled in dependence on the predicted food item core temperature.

Figure 1:
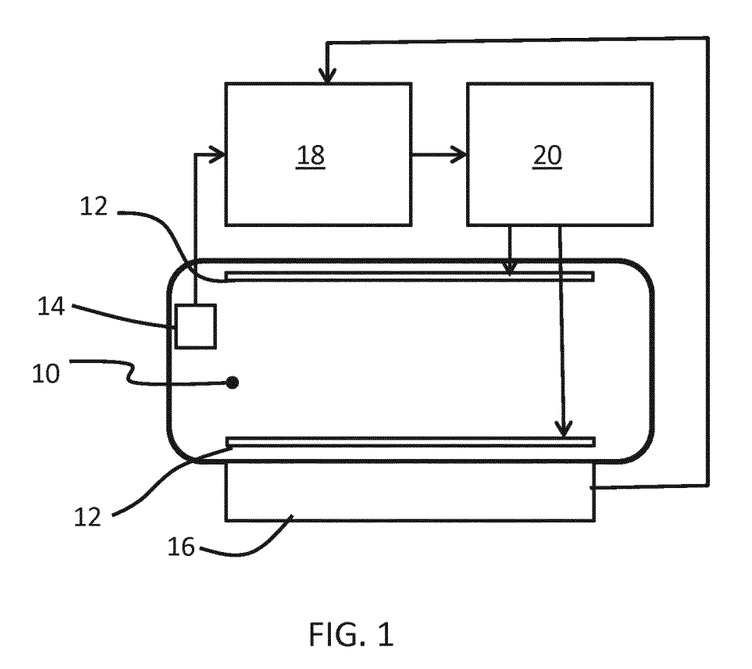
FIG. 1 shows a cooking device according to an example of the invention.

FIG. 1 shows an example of the device in accordance with an embodiment of the invention.

The cooking device comprises a heating chamber 10 in which a food item to be cooked is placed, and a heating element 12 for heating a cooking medium in the heating chamber (for example air).

The heating chamber is preferably a closed space in the cooking device, so that the temperature within the space can be reliably controlled and therefore taken into account in the food item core temperature prediction. Thus, the closed space may be an oven with a closeable door, the closed volume of an air fryer or the closed volume of an oil fryer. Such temperature control will be more difficult in an open heating space.

A temperature sensor 14 is for monitoring a temperature of the cooking medium over time. A mass sensor 16 is for monitoring a mass of a food item to be cooked in the heating chamber over time. This mass sensor may measure the mass of cooker itself including the food item to be cooked, and in this way it can be external to the heating chamber 10 as shown in FIG. 1. Alternatively, it may be internal to the heating chamber, for example forming a part of a cooking shelf on which the food item is to be placed. The mass sensor may be implemented as a pressure sensor.

A processor 18 processes information from the mass sensor and temperature sensor to provide a prediction of the food item core temperature and to control the cooking process in dependence on the predicted food item core temperature.

The sensors are used to supply information to an algorithm run by the processor 18 to provide core temperature prediction, in particular using parameters that can be easily obtained in the cooking system. These parameters can be detected, determined or estimated without invasion or destruction of food. As a minimum for the invention, they include the cooking medium temperature, the mass and time (which is monitored by the processor).

There may be other parameters monitored. For example, the parameters may comprise a combination of air or oil temperature, air or oil temperature rate of change, a surface temperature of food, a rate of change of the surface temperature of food, weight of food, weight loss rate of food, moisture content of food, the rate of change of moisture content, the humidity of the surrounding air, the rate of change of humidity etc.

The relationship between the core temperature and a set of these parameters is first established, then the core temperature can be predicted by that relationship. The predicted core temperature can then be employed to judge the cooking status of the food and as a result can be used to control the process.

The detectors are used in real time during the cooking process.

The detectors include a timer implemented by the processor, the temperature sensor which may be a thermometer, thermocouples, or infra red sensor, and the mass sensor which may be a pressure sensor. The additional sensors may for example include a humidity sensor and a surface temperature probe. The selection of parameters to be sensed may vary among different cooking appliances.

The processor 18 includes a data recording and processing module. This module records the detected values of the monitored parameters during cooking and the profiles may for example be pre-processed in this module, for example to apply data smoothing.

The processor implements a prediction algorithm in a prediction module. This module stores the relationship between the core temperature of the food item and the monitored parameters. By employing the data from the data recording and processing module, the core temperature of the food item is predicted in real time.

The relationship can be obtained by analyzing mass/heat transfer as well as applying mass/heat balance for the targeted cooking system.

The system has a cooking controller 20 which uses the predicted core temperature of the food item to control the cooking process. The predicted core temperature of the food item is assessed to determine if it is in a desired temperature range (e.g., required by a certain doneness level) and the control decisions are made based on the assessment results.

For example, the core temperature of veal or lamb steaks for the doneness of 'medium well' is in the range of 65-69° C. This doneness level is selected before the cooking of veal or lamb. As the cooking starts, the detectors begin measuring in real time the parameters and transmit the data to data storage and processing module; the prediction module continuously receives information from the data storage and processing module and predicts the core temperature using the stored algorithm.

The predicted core temperature is then transmitted to the controller 20. If the predicted core temperature falls below the desired range mentioned above, the cooking process will continue with a given heating program (e.g., heating with power of 800 W); when the predicted core temperature falls in that range, the cooking process will be stopped.

The algorithm stored in the prediction module mainly refers to an established relationship between core temperature and the monitored parameters ("MP"s). The relation may be a direct function as generalized in Eq. (1) below, or it may require the solving of a differential equation as generalized in Eq. (2) below, where the changing rate of the core temperature is related to parameters based on the energy/mass balance of the cooking system.

Specific equations, such as Eq. (7) derived below, can be obtained with appropriate simplification of the cooking system as well as the food shape.

$$T_C = f(MPs) \tag{1}$$

$$\frac{dT_C}{dt} = g(MPs) \tag{2}$$

The process of dry frying is used to explain the working principle of the invention in more detail.

Parameters including the temperature of the cooking medium (air, oil, etc.), the mass and the rate of change of mass of the food are chosen as the monitored parameters. Thus, the sensors comprise one or more temperature sensors for air temperature measurement and pressure sensors (e.g., balances) for mass and rate of change of mass.

The initial temperature of the food is also determined by thermometers or other approaches. For example the temperature of a food item taken from a freezer at a known temperature will be known without taking additional measurements.

The sensors as well as the food initial temperature information are all provided to the processor 18. The data storage and processing module receives the data from the connected sensors and sends the treated information to the prediction module and the predicted core temperature is then transmitted to the controller 20 and cooking control decisions are made based on the received information.

The use of the method involves following steps:

(i) The food is placed in the food container. The type of food is provided by manual input from the user. The doneness level is also selected manually depending on the user's personal preference. If it is not selected, a default medium doneness level is automatically selected.

(ii) The initial temperature of the food is recorded and stored in the data storage and processing module. This may have been input by the user or it may be detected by the cooking appliance. By way of example, a prediction model can also be used to determine the initial food temperature. The input to the model can include the weight loss of the food at a given cooking time. The principle behind this is that after a given cooking duration a frozen food item has less water evaporation than a fresh one because the former requires extra heat for the water phase change, i.e., from solid to liquid. This approach can be used to categorize the food as frozen or non-frozen. One or more intermediate categories may also be defined.

Detection of the food temperature is not essential. It may suffice for the user to enter a category such as frozen temperature, fridge temperature or room temperature.

(iii) The cooking process is started and the temperature of the cooking medium in the cooking appliance is detected in real time by the temperature sensors. The temperature of the heating conductor, $T_{hc}$ may also be recorded. The cooking time is also monitored so that a temperature-time profile can be obtained and stored in the data storage and processing module. The temperature-time profile is pre-treated (e.g., smoothed).

(iv) The treated temperature-time profile before the present time and the initial temperature of the food are sent to the prediction module, where the core temperature is predicted by the established relationship between the core temperature and the monitored parameters.

(v) The predicted core temperature is sent to the controller 20 and the control decisions are made. If the predicted temperature does not reach the temperature or does not fall in the temperature range that is required by the initially selected doneness level, the cooking process continues according to a certain heating program. The steps (iii) to (v) are repeated, until the predicted temperature reaches the temperature, or falls in a range that is required by the initially selected doneness level.

(vi) A cooking ending process starts. The ending process could be either holding heating in a certain power for a certain time period, or stopping heating immediately, or following other heating programs.

For the prediction of the core temperature in an actual cooking process, the correlation with the monitored parameters has to be established and stored in the prediction module. Considering the fact that the heat transferred from air to food equals the heat obtained by food, the heat balance can be described by Eq. (3):

$$Cp_F * d(m_F * T_F)/dt = k * S_F * (T_A - T_S) \quad (3)$$

$Cp_F$ is the heat capacity of the food, assumed as constant; $m_F$ is the mass of the food; $T_F$ is the average temperature of food; $T_S$ is the surface temperature of food; k is the heat transfer index from air to food; $S_F$ is the surface area of the food; and $T_A$ is the air temperature.

The average temperature of food, $T_F$, can then be calculated based on Eq. (4) derived from Eq. (3):

$$\frac{dT_F}{dt} = \frac{k * S_F}{Cp_F^* m_F}(T_A - T_S) - \frac{T_F}{m_F} * \frac{dm_F}{dt} \quad (4)$$
$$= \frac{P}{m_F}(T_A - T_S) - \frac{T_F}{m_F} * \frac{dm_F}{dt}$$

P is a lumped parameter.

The relationship between the core temperature of food, $T_C$, and $T_S$, $T_F$ varies with factors such as food shape, surface area, structure/composition, etc. To simplify, the food is assumed to be a sphere with an effective radius of R'. For a certain type of food and under a certain cooking condition, the relationships between $T_S$ and $T_C$ and between $T_F$ and $T_C$ can be expressed as:

$$T_S = \alpha T_C \quad (5)$$

$$T_F = \frac{3 * \alpha + 1}{4} * T_C \quad (6)$$

α is a parameter describing the temperature ratio of surface to core, which is mainly determined by the effective radius, R', of the food, explained further below.

As a result, Eq. (4) becomes:

$$\frac{dT_C}{dt} = \frac{P}{m_F}\left(\frac{4}{3\alpha+1}T_A - \alpha T_C\right) - \frac{T_C}{m_F} * \frac{dm_F}{dt} \quad (7)$$

As can be seen, the variable parameters needed to be monitored in order to create a differential equation only in $T_C$ are the food mass, the rate of change of food mass and the air temperature.

The prediction of the core temperature follows the steps below:

(i) Data is received from the data storage and processing module. The data includes cooking medium (e.g. air) temperature, initial temperature of the food, mass of the food and the rate of change of mass of the food.

(ii) The effective radius, R', of the food is determined based on information such as food size, structure, etc. as explained below.

(iii) The value of α is calculated.

(iv) The differential equation is solved with the received data. The core temperature-time profile is predicted and the core temperature at the present time moment is obtained.

This process requires the determination of P and α.

For a certain type of food, a is firstly related to the mass of food.

$$\alpha = A * e^{B*R'}/(A+R') \quad (8)$$

$$\text{Where, } R' = \sqrt[3]{\frac{3m_F}{4\pi\rho}} \quad (9)$$

ρ is the density of food in kg/m³.

The values of P and parameters involved in Eq. (8) can then be obtained by training with sufficient test data. Training of the parameters can be based on minimizing the sum of squares of the prediction error between the predicted and actual-measured core temperatures. Samples with different food amounts are employed in the experimental training and the core temperature and weight are recorded in real time for training.

The core temperature is used for doneness control. However, a surface or volumetric temperature can also be predicted. For some food types control of the surface temperature may be of interest to control the cooking. Core temperature is especially for interest for foods with relatively large size, since there will be an obvious temperature difference between the core and the surface.

As mentioned above, the relationships between $T_S$ and $T_C$ and between $T_F$ and $T_C$ vary for different types of foods. As an example, spherical foods are employed to demonstrate the establishment of the relationship between α and $m_F$.

This type of food is close to a sphere in shape with an averaged diameter of R'. The diameter can be estimated from mass of food, by Eq. (10):

$$R' = \sqrt[3]{\frac{3m_F}{4\pi\rho}} \qquad (10)$$

$\rho$ is the density of the food in kg/m³, $m_F$ is the initial mass of food in kg.

The ratio of surface temperature to core temperature is assumed constant for most of the cooking time before doneness, $$T_S = \alpha T_C \qquad (11)$$

The temperature distribution function of the spherical food is:

$$T = \frac{T_S - T_C}{R} * x + T_C \qquad (12)$$

x is the distance from an arbitrary point to the core of the food; the temperature is assumed to linearly change along radius.

The average temperature of food can be calculated by Eq. (13):

$$T_F = 3/4 * \int_0^R \frac{(4\pi x^2 * T)dx}{\pi R^3} \qquad (13)$$

From Eqs. 11, 12 and 13:

$$T_F = \frac{3*\alpha + 1}{4} * T_C \qquad (14)$$

As a result, Eq. (4) becomes, $$\frac{dT_C}{dt} = \frac{P}{m_F}\left(\frac{4}{3\alpha+1}T_A - \alpha T_C\right) - \frac{T_C}{m_F} * \frac{dm_F}{dt}$$

The relationship between $\alpha$ and R' is assumed to be as follows, $$\alpha = A * e^{B*R'}/(A+R') \qquad (15)$$

In Eq. (15), A and B are constants, which are related to the size of food. R' can be obtained from Eq. (9). A and B can be obtained by training with test data.

Other shapes of foods, such as cubic, rod, etc., can also be treated as the way mentioned above. The effective radius can also be calculated by Eq. (9). Note that, the values of A and B in Eq. (15) will be different even for the same type of foods.

The effectiveness of the core temperature prediction has been demonstrated by experimentation, carried out using a Philips air fryer.

A balance is placed under the fryer as shown in FIG. 1 to measure the mass ($m_F$) during the cooking time. Two thermometers are placed in the air fryer to detect the air temperature ($T_A$) around the food. The initial temperature of the food is pre-measured by a thermometer.

The mass data series from the balance is smoothed and a derivative is taken to obtain the change rate of mass ($dm_F/dt$).

The detected air temperatures by the two thermometers are averaged to reduce measurement error. During the experiment, the frying temperature is selected as 200° C. and the reference core temperature of the food is measured by several thermometers by directly inserting the probe into the center. The measured core temperatures are averaged before use.

Figure 2:
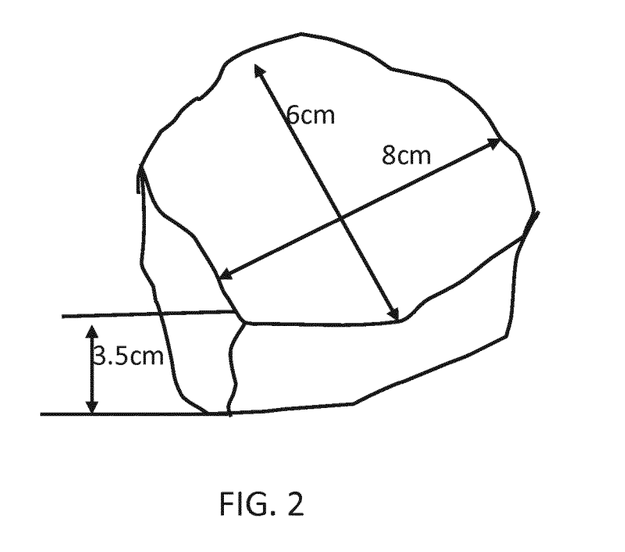
FIG. 2 shows a meat sample used to demonstrate experimentally the effectiveness of the device and method.

The food employed in the experiments was a meat steak. Three meat steaks with similar shapes were employed and the masses of the three testing samples were 212 g, 215 g and 184 g, respectively. FIG. 2 shows the dimensions of one of the meat steaks used. This steak has a generally cuboid shape of around 8 cm×6 cm×3.5 cm and a mass of 212 g.

The values of effective radius R' are calculated based on the initial mass of the food as explained above. Experimental results are used to train the parameter P in Eq. (4). By considering the assumed relationship between $\alpha$ and R', (Eq. (8)) the values of A and B are also fit.

The two parameters A and B are specific for a certain type of food, the shape/size of which is within a certain degree. The value of P is a lumped parameter containing other parameters such as k (heat transfer index from air to food), $S_F$ (surface area of food) and $Cp_F$ (heat capacity of food), which may all change with cooking time. As a result, it is preferred for the training to proceed stage by stage in order to guarantee trained values close to the actual values as much as possible. Two stages are considered.

The trained values for the parameters in this example were:
P=3.8894e-5 ($T_C$<15° C.); 1.1679e-4 ($T_C$>15° C.)
A=138.3564
B=6.2867

Figure 3:
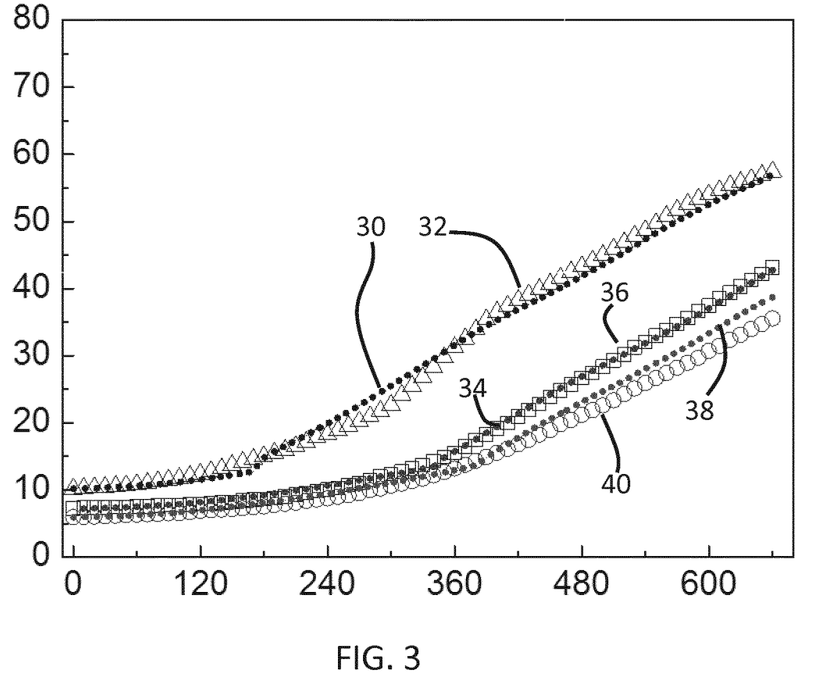
FIG. 3 shows experimental results.

The prediction of the core temperature compared to the measured core temperature over time is shown in FIG. 3. The y-axis plots core temperature (degrees C.) and the x-axis plots time (s).

Plot 30 is the predicted core temperature for the 184 g sample and plot 32 is the measured core temperature.

Plot 34 is the predicted core temperature for the 212 g sample and plot 36 is the measured core temperature.

Plot 38 is the predicted core temperature for the 215 g sample and plot 40 is the measured core temperature.

It can be seen that the predicted values agree well with the actual ones. The RMS error is 1.2° C. and the largest error (absolute value) is 3.2° C.

The predictive approach described above involves a model with pre-trained parameters.

The parameters can be adjusted to improve accuracy. The pre-trained values are determined by training experiments under various conditions, but there may still exist some exceptions where the prediction accuracy is not acceptable under some cooking conditions. A real time adaptive predictive method is described below as an enhancement to the basic approach described above, in order to make the model more robust. This enables more reliable prediction based on the real time feedback of the cooking status and thus enables more accurate control of the cooking process.

The prediction module described above is enhanced by predicting at least one other variable (other than core temperature) relating to the cooking process.

In particular, the prediction model further provides a prediction of at least one measurable property, and wherein the controller is adapted to update the model based on monitoring of the measurable parameter to provide a more accurate model for the prediction of the food core temperature.

The additional variable relating to the cooking process could be the mass of food, the temperature of the air around the food, humidity of the air around the food, etc. The adjusted internal/core temperature is predicted based on the same model but with adjusted parameters making use of actual monitoring of the additional variable. Adjusted parameter values are thus derived from an adaptive module.

This adaptive module adjusts the parameter(s) of the model based on the real time feedback of the cooking status. By considering the differences between the measured and model-generated values of the variable(s) relating to the cooking process, the parameter(s) of the model is (are) adjusted following a certain adaptive algorithm. The adjusted parameter(s) is (are) then transmitted to the prediction module to give an adjusted predicted internal/core temperature. A gradient descent algorithm can be employed by the adaptive module:

$$k'=k-\mu*(\partial E/\partial k) \quad (16)$$

k is a parameter that is to be adjusted and μ is a positive constant determining the adaptation rate. The value of μ in Eq. (16) could be determined during the pre-training of the model parameters. Generally, it is determined by considering the possible variations of the model parameters with cooking time as well as under various cooking conditions during a parameter-training process. The determined value should maintain the predicting stability of the model.

E is the function expressing the predicting error, which should reflect the 'absolute difference' between measured and predicted values. For example, it could be a function of the absolute value of the difference, or the even power (2, 4, 6, . . . ) of the difference between the measured and predicted values.

∂E/∂k is the partial derivative of E with respect to k.

To illustrate the structure of the adaptive model, a simplified empirical model for a cooking system is proposed as an example. Two status variables could be predicted by the model, core temperature as explained above, and also the mass of food as illustrated in Eqs. (17) and (18).

$$T_C T_{C0}*e^{k(t^2)} \quad (17)$$

$$m_F \sqrt{m_{F0}^2-k*a*t} \quad (18)$$

k and a are model parameters (constants) and k is a shared parameter for core temperature and mass prediction equations. $T_C$ is the core temperature of food; t the cooking time; $T_{C0}$ the initial core temperature; $m_F$ the mass of food; $m_{F0}$ the initial mass of food.

An adaptive algorithm adjusts one or more of the model parameters by minimizing the predicting error of the 'extra' status variable, which in this case is the mass.

For the simplified model established above, the parameter adjusting method is to minimize the following constructed predicting error function, E $$E=½*(m_{FP}-m_{FE})^2 \quad (19)$$

$m_{FP}$ is the predicted mass of the food and $m_{FE}$ is the actually measured mass of the food. The minimization could be realized by using a gradient descent algorithm as shown in Eq. (16).

Based on Eqs. (17) and (18), $$\partial E/\partial k=½*(e*a*t)m_{FP} \quad (20)$$

where, $$e=m_{FP}-m_{FE} \quad (21)$$

Figure 4:
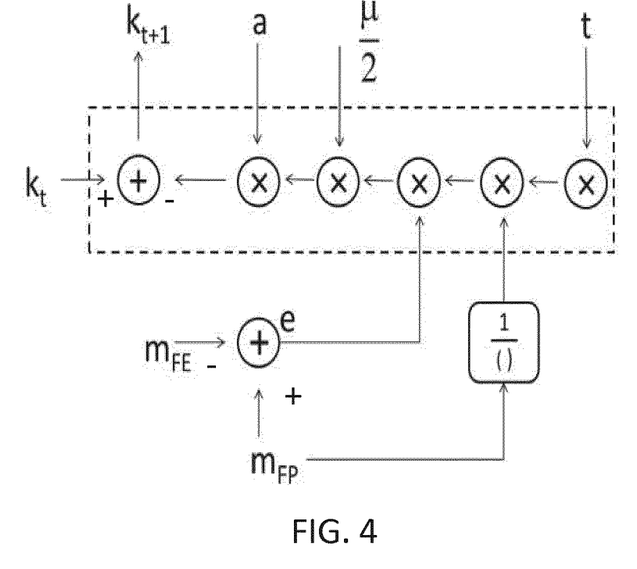
FIG. 4 shows how a parameter can be updated to improve modeling accuracy.

The corresponding process flow is shown in FIG. 4. FIG. 4 shows how equations 16, 20 and 21 are implemented. In discrete time, k' in Eq. 16 becomes $k_{t+1}$ and becomes $k_t$.

In particular, substituting Eqs. 20 and 21 into Eq. 16 yields:

$$k'=k-½a*\mu*t(m_{FP}-m_{FE})/m_{FP} \quad (22)$$

FIG. 4 is the discrete time implementation of this equation.

An example is given below to show the adaptive principle based on the model mentioned above.

The system operates in the same way as described above, with the addition of the adaptive processing module which in this example receives the real time mass measurement. The prediction of core temperature and mass are made using the model so that the predicted mass and the real time measured mass can be compared. The discrepancy is used to adjust one or more parameter(s) of the model used in the prediction module. The adjusted one or more parameters are then sent to the prediction module to update the model.

The core temperature is predicted based on the updated model and a new value is obtained.

It should be noted that the forms of the models may be food type-dependent, which means that for different types of foods, the model may be in formats other than shown in the equations above. For example, the core temperature of French fries will reach a temperature platform at around 100° C. before doneness, which is different from the situation of meat balls: the core temperature is continuously increasing from the initial temperature to around 70° C. before doneness. Moreover, the status variables that will be predicted may also be different according to the different models established for the corresponding types of foods.

A generally trained model could predict core temperature of food with sufficient accuracy for most cases if the parameters of the model have been already trained by suitable experiments. However, there may still exist cases where the prediction of the model deviates from the experiments. The adaptation improves the pre-trained model for an actual food and heating system, thus giving more robust cooking control.

In the following example, meat balls with initial core temperature of 12.8° C. and initial mass of 273.2 g (mass of each meat ball is ~27.3 g) were heated in a Philips air fryer. The frying temperature was selected as 200° C. The model established as Eqs. (17) and (18) is used to predict the core temperature. The parameters of the model are pre-trained by frying meat balls in the air fryer, k=7.3880e-6 a=4.6247e4

To introduce a discrepancy between the model and actual system, a certain error 6 was added to the parameter k (to increase by 20%).

Figure 5:
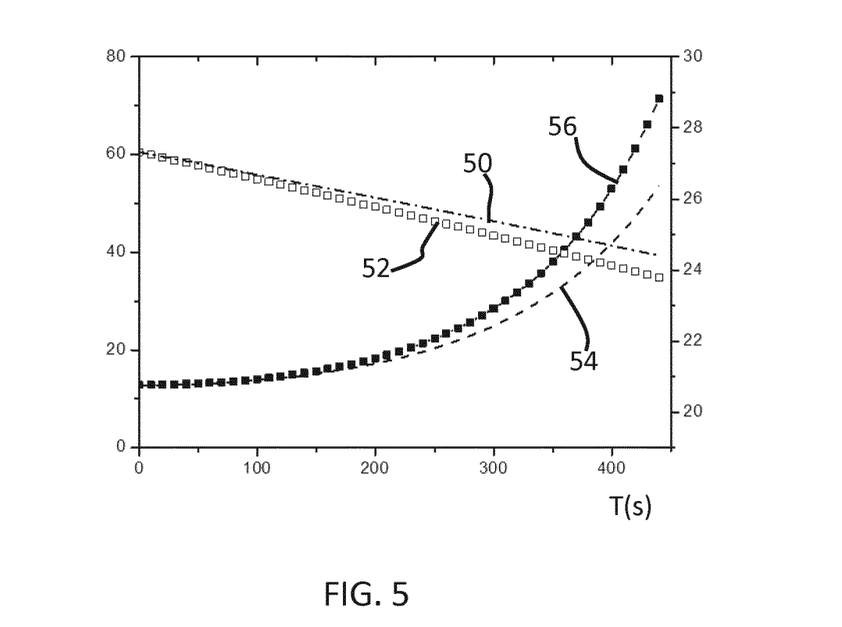
FIG. 5 shows experimental results based on a deliberately inaccurate model.

The core temperature and mass of the meat balls as predicted and as measured is shown in FIG. 5.

FIG. 5 plots the core temperature (degrees C.) on the left hand y-axis and the mass (g) on the right hand y-axis and the time on the x-axis.

Plot 50 is the predicted mass, plot 52 is the actual mass, plot 54 is the predicted core temperature and plot 56 is the actual core temperature.

This deliberate error means that the differences between predicted and actual core temperatures are very large.

In order to correct this situation, the adaptive predictive method discussed above was employed. The parameter k was adapted according to Eq. (16) where the factor □ was taken to be 6.5e-12.

Figure 6:
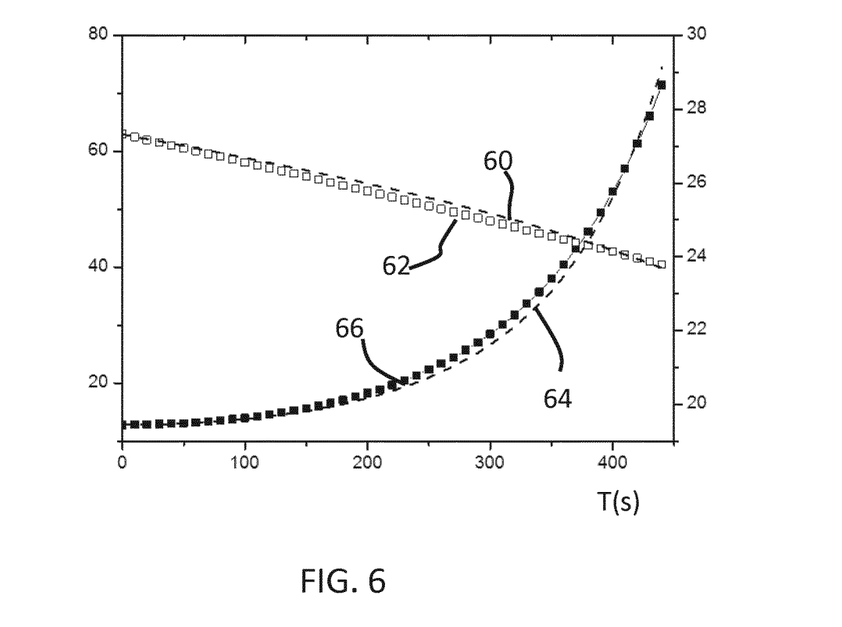
FIG. 6 shows how the learning process can improve the experimental results of FIG. 5.

The predicted core temperature with the adjusted value of k is shown in FIG. 6.

FIG. 6 also plots the core temperature (degrees C.) on the left hand y-axis and the mass (g) on the right hand y-axis and the time on the x-axis.

Plot 60 is the predicted mass, plot 62 is the actual mass, plot 64 is the predicted core temperature and plot 66 is the actual core temperature.

The prediction accuracy for core temperature is greatly improved (root-mean-square error before adaptive prediction: 5.9° C., root-mean-square error after adaptive prediction: 2.3° C.).

Figure 7:
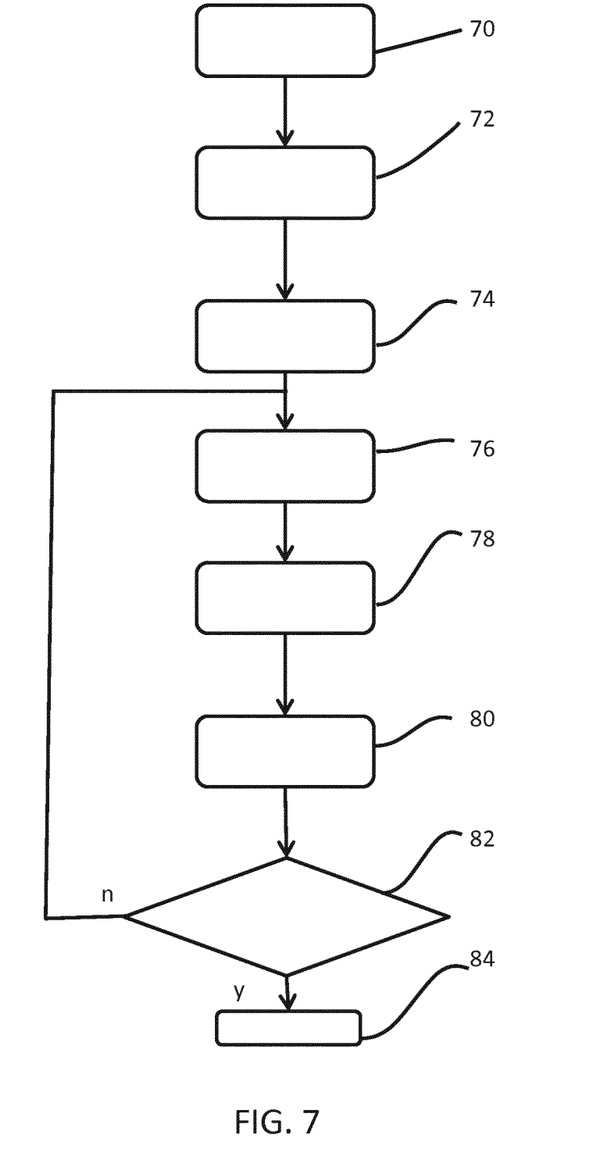
FIG. 7 shows an example of a method in accordance with an embodiment of the invention as a flow chart.

FIG. 7 shows cooking method of the invention, incorporating the method of determining food core temperature.

In step 70, the user enters a food type to a user interface of the cooking device, and also a desired doneness level.

In step 72, either the user enters a starting temperature of the food, or else the cooking device may determine the initial food temperature, assuming it is constant throughout.

In step 74, the user puts the food in the cooking device and starts the cooking cycle.

The mass and temperature are monitored over time in step 76, optionally as well as any additional parameters, for example for the adaptive algorithm learning process.

In step 78, if the adaptive algorithm is used, the additional parameter is predicted (which may be the mass), and this additional parameter is measured. The model is updated if needed.

In step 80 the core temperature is predicted based on the model or the updated model (if the adaptive algorithm is used).

In step 82, it is determined if the target core temperature is reached. If it is not, the cooking process continues (steps 76,78,80) and if it is, the end cooking sequence takes place in step 84.

The invention is used to predict core temperature. However, it can additionally be used for food surface and volumetric temperature prediction for cooking control. It is of particular interest for cooking appliances using dry heating, such as ovens and air fryers, although it can also be used for oil fryers.

The equations above provide only one possible basis for the algorithms, and other approximations and simplifications can lead to other algebraic solutions. These will not change the underlying inventive concept.

The system makes use of a controller for implementing the model defining the algorithm (shown in the example above as a processor) and for controlling the cooking cycle. Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A cooking device, comprising:
    a heating chamber;
    a heating element configured to heat a cooking medium in the heating chamber;
    a temperature sensor configured to monitor a temperature of the cooking medium in said heating chamber over time;
    a mass sensor configured to monitor a mass of a food item in the heating chamber over time; and
    a controller configured to:
        receive mass information from said mass sensor;
        receive temperature information from said temperature sensor;
        predict a core temperature of said food item based on an initial temperature of said food item, the mass of the food item, and a rate of change of said mass of said food item;
        control a cooking process involving the heating element heating the cooking medium in dependence on the predicted food item core temperature, wherein said heating of said cooking medium is adaptively modified based on the predicted food item core temperature matching a predetermined model of the cooking process; and
        halt said cooking process when the predicted food item core temperature achieves a desired core temperature.

2. The cooking device of claim 1, wherein the controller is configured to:
    perform said cooking process differently for different food types, said mass sensor information, and said temperature sensor information.

3. The cooking device of claim 1, further comprising:
    a sensor configured to determine said initial temperature, wherein the controller is configured to perform said cooking process differently for different initial temperatures, the information from the mass sensor, and the information from the temperature sensor.

4. The cooking device of claim 1, wherein the cooking medium is one of: air and oil.

5. The cooking device of claim 1, further comprising:
    one or more additional sensors configured to monitor at least one of: humidity, a food moisture level, and a food surface temperature.

6. The cooking device of claim 1, wherein the mass sensor comprises a pressure sensor.

7. The cooking device of claim 1, wherein the controller is further configured to:
    provide the prediction of the food item core temperature by comparison with said predetermined model, wherein said predetermined model is associated with specific food types and initial temperatures.

8. The cooking device of claim 1, wherein the controller is further configured to:
    provide the prediction of the food item core temperature by comparison with said predetermined model, wherein said predetermined model provides a prediction of at least one measurable property, and wherein the controller is configured to:
        update the predetermined model based on monitoring of the measurable a parameter to provide a more accurate model for the prediction of the food item core temperature.

9. A cooking device for cooking food items, said cooking device comprising:
a heating chamber comprising:
a heating element;
a first sensor to measure a temperature;
a second sensor to measure a mass of said food item; and
a processor configured to:
receive each of said measured temperature and said measured mass of said food item;
initiate a cooking process of the food item based on the temperature;
predict a core temperature of the food item based at least on a rate of change of said mass of said food item during said cooking process, wherein an expected rate of change of mass information is stored in a data base;
adaptively control said heating element to heat a heating medium in said heating chamber based on the predicted core temperature matching the rate of change of mass information stored in the data base; and
halt the cooking process when the predicted core temperature of the food item achieves a desired core temperature.

10. The cooking device of claim 9, wherein said data base comprises:
a plurality of predetermined rates of changes of said mass of said food item, wherein said processor is configured to:
compare said rate of change of said mass of said food item to said plurality of predetermined rates of change of said mass of said food item; and
predict said core temperature based on said rate of change of said mass of said food item matching one of said predetermined rates of changes of said mass of said food item.

11. The cooking device of claim 10, wherein said data base comprises:
a plurality of said plurality of predetermined rates of changes, wherein each of said plurality of predetermined rates of changes are associated with a specific food item.

12. The cooking device of claim 10, wherein said processor is configured to:
initiate the cooking process based on an initial temperature of said food item and an initial mass of said food item.

13. The cooking device of claim 9, further comprising:
an input means, wherein said input means is configured to:
provide an indication of a type of said food item.

14. The cooking device of claim 13, wherein said input means is configured to:
provide an indication of a state of said food item.

* * * * *